(12) United States Patent
Hawtof

(10) Patent No.: US 6,837,076 B2
(45) Date of Patent: Jan. 4, 2005

(54) METHOD OF PRODUCING OXIDE SOOT USING A BURNER WITH A PLANAR BURNER FACE

(75) Inventor: Daniel W. Hawtof, Painted Post, NY (US)

(73) Assignee: Corning Incorporated, Corning, NY (US)

(*) Notice: Subject to any disclaimer, the term of this patent is extended or adjusted under 35 U.S.C. 154(b) by 59 days.

(21) Appl. No.: 10/361,947

(22) Filed: Feb. 10, 2003

(65) Prior Publication Data

US 2003/0167796 A1 Sep. 11, 2003

Related U.S. Application Data

(62) Division of application No. 09/581,200, filed as application No. PCT/US98/25608 on Dec. 3, 1998, now abandoned.
(60) Provisional application No. 60/068,255, filed on Dec. 19, 1997.

(51) Int. Cl.[7] .................................................. C03B 37/018
(52) U.S. Cl. ........................... 65/413; 65/531; 65/17.4; 239/418; 239/568; 239/553.3; 239/549
(58) Field of Search ..................... 65/413, 531, 17.4; 239/418, 568, 553.3, 549

(56) References Cited

U.S. PATENT DOCUMENTS

| | | | |
|---|---|---|---|
| 3,662,960 A | | 5/1972 | Mitchell et al. ............ 239/400 |
| 3,921,916 A | | 11/1975 | Bassous ...................... 239/601 |
| 3,936,633 A | * | 2/1976 | De Kalb et al. .............. 378/45 |
| 4,169,008 A | | 9/1979 | Kurth ......................... 156/600 |
| 4,526,599 A | * | 7/1985 | Barns et al. ................. 427/231 |
| 4,682,994 A | | 7/1987 | Mansfield .................... 65/3.12 |
| 4,684,384 A | * | 8/1987 | Berkey ........................ 65/531 |
| 4,828,184 A | | 5/1989 | Gardner et al. ............. 239/590 |
| 4,880,163 A | | 11/1989 | Kobayashi et al. ......... 239/422 |
| 5,110,335 A | * | 5/1992 | Miller et al. ................. 427/167 |
| 5,116,400 A | | 5/1992 | Abbott et al. ................. 65/144 |
| 5,203,897 A | * | 4/1993 | Powers et al. ................ 65/144 |
| 5,211,732 A | | 5/1993 | Abbott et al. ................ 65/3.12 |
| 5,449,114 A | | 9/1995 | Wells et al. .................... 239/5 |
| 5,599,371 A | | 2/1997 | Cain et al. .................... 65/413 |
| 5,622,750 A | * | 4/1997 | Kilian et al. ............. 427/163.2 |
| 5,702,495 A | * | 12/1997 | Hiraiwa et al. .............. 65/17.1 |
| 5,735,928 A | * | 4/1998 | Sayce et al. ................. 239/422 |
| 5,979,185 A | * | 11/1999 | Blackwell et al. ........... 65/17.4 |
| 6,189,214 B1 | * | 2/2001 | Skeath et al. ............... 239/422 |
| 6,260,385 B1 | * | 7/2001 | Sempolinski et al. ........ 65/17.4 |
| 6,312,656 B1 | * | 11/2001 | Blackwell et al. .......... 423/337 |
| 6,374,642 B1 | * | 4/2002 | Blackwell et al. ........... 65/17.4 |

FOREIGN PATENT DOCUMENTS

| | | | |
|---|---|---|---|
| WO | WO 98/01228 | 1/1998 | .............. B05B/7/08 |
| WO | WO 98/01705 | 1/1998 | ........... F23D/11/10 |
| WO | WO 99/32410 | 7/1999 | ............. C03B/8/04 |

* cited by examiner

*Primary Examiner*—John Hoffmann
(74) *Attorney, Agent, or Firm*—Randall S. Wayland; Scott S. Servilla

(57) ABSTRACT

A burner and a method for producing an inorganic soot such as silica comprising a plurality of substantially planar layers having multiple openings therethrough formed by a micromachining process. The openings are in fluid communication with a precursor inlet and a gas inlet to permit the gas and the precursor to flow through and exit the burner. The burner produces a flame from a combustible gas in which the precursor undergoes a chemical reaction to form the soot.

6 Claims, 11 Drawing Sheets

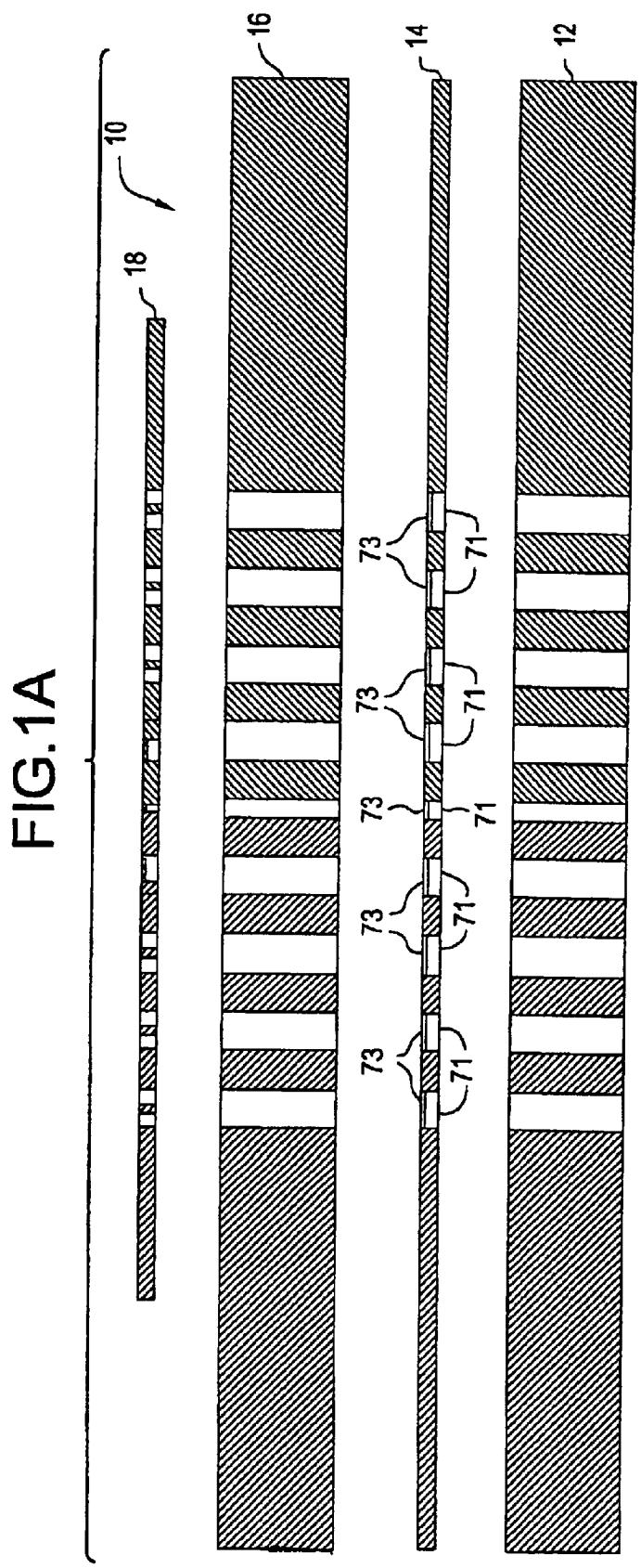

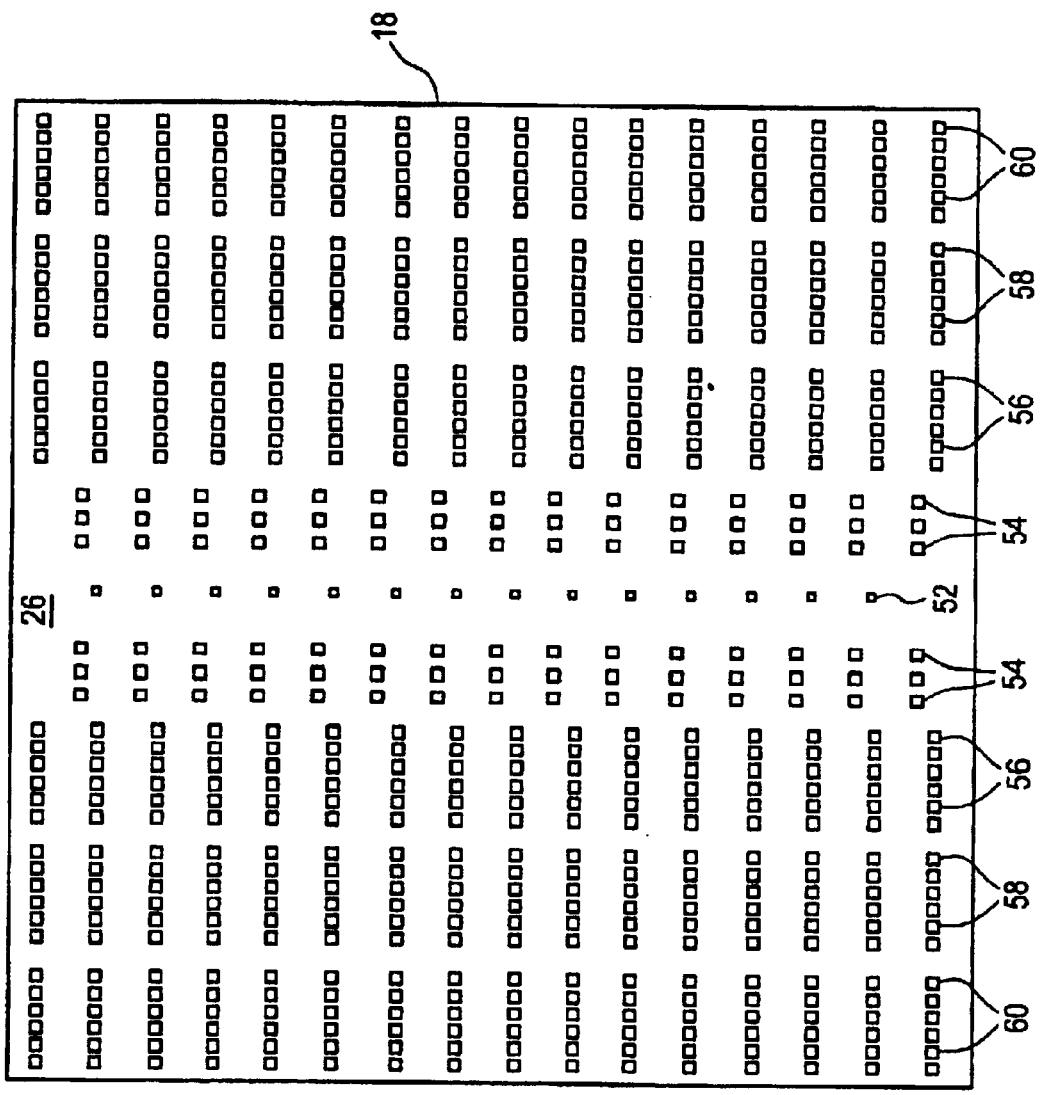

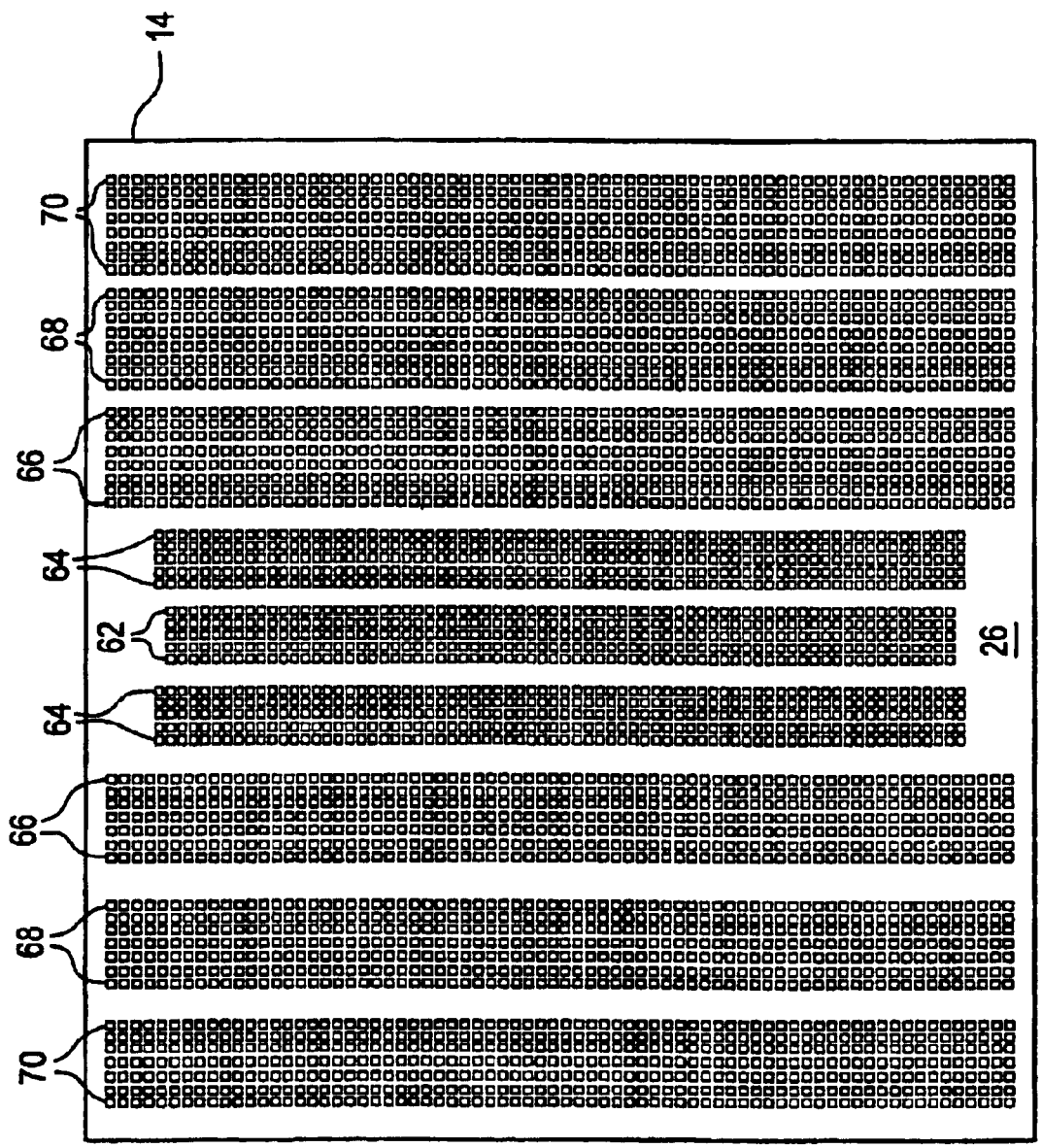

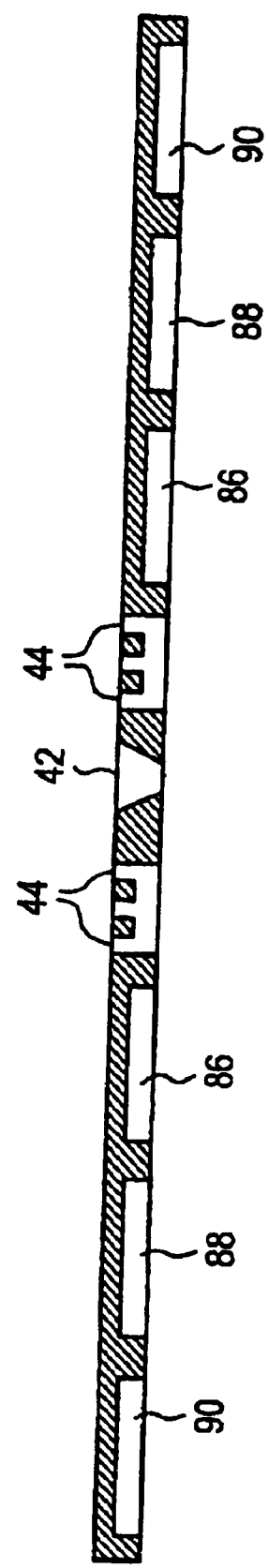

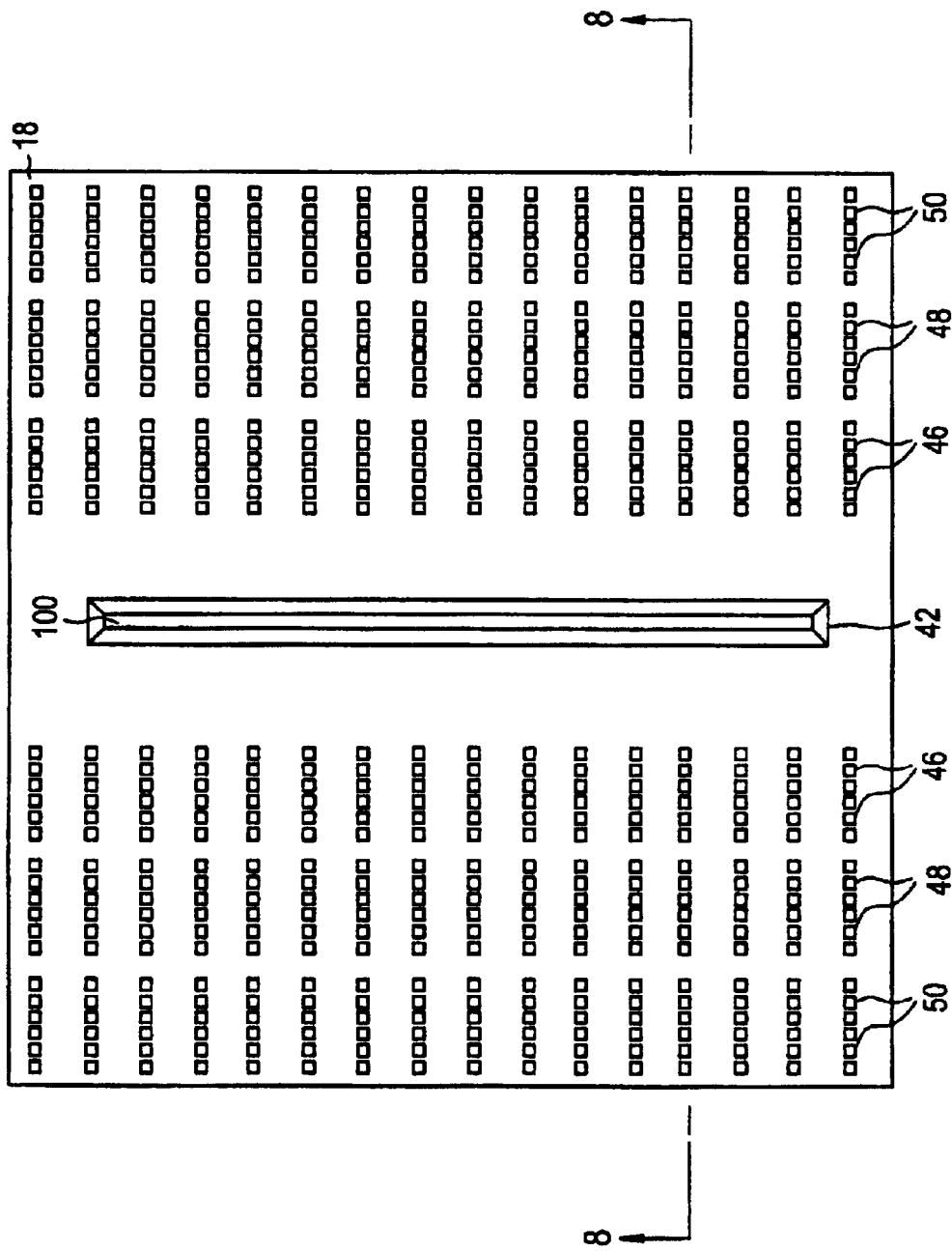

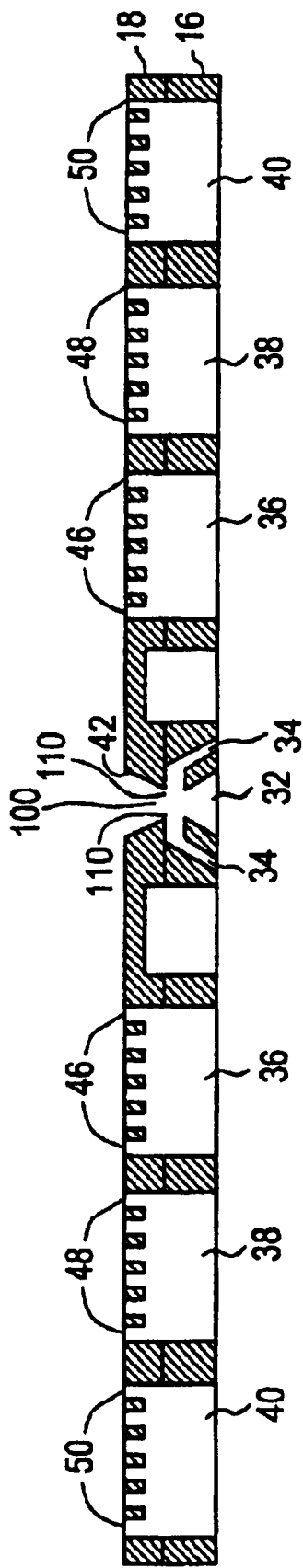

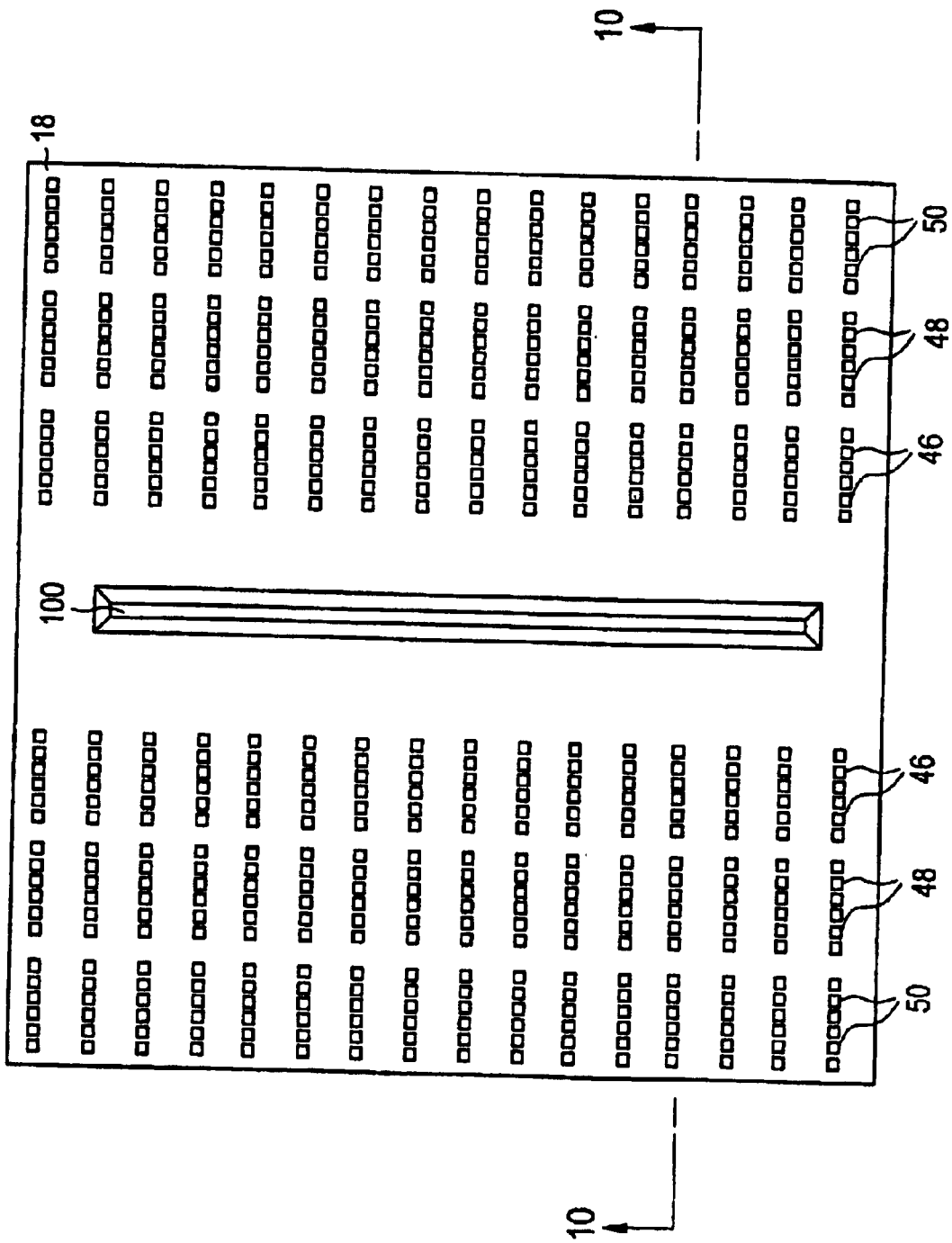

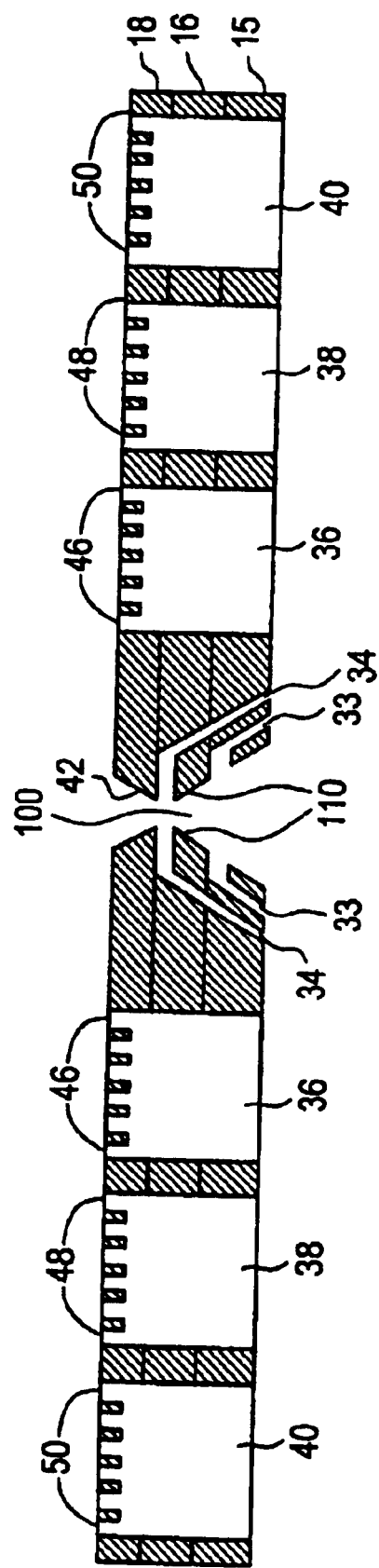

METHOD OF PRODUCING OXIDE SOOT USING A BURNER WITH A PLANAR BURNER FACE

CROSS-REFERENCE TO RELATED APPLICATIONS

This is a divisional of U.S. patent application Ser. No. 09/581,200 filed on Jul. 20, 2000, (now abandoned) the content of which is relied upon and incorporated herein by reference in its entirety, and the benefit of priority under 35 U.S.C. 120 is hereby claimed. Ser. No. 09/581,200 was the National Stage of International Application PCT/US98/25608 filed Dec. 3, 1998 which claims the benefit of U.S. Provisional Application No. 60/068,255 filed Dec. 19, 1997.

FIELD OF THE INVENTION

The present invention relates to burners for producing inorganic soot. More particularly, the present invention involves burners for producing a flame in which a precursor material undergoes a chemical reaction to form a metal oxide soot.

BACKGROUND OF THE INVENTION

The formation of inorganic soot, particularly metallic oxide soot, produced by reacting a precursor in the flame of a burner is well known. For example, soot generated by such a reaction has been used to form articles such as crucibles, tubing, lenses, and optical waveguides by depositing the soot on a receptor surface.

This process is particularly useful for the formation of optical waveguide preforms made from doped and undoped silica soot, including planar waveguides and waveguide fibers. The waveguide formation process generally involves delivering a silicon-containing precursor to a burner and reacting the precursor in a burner flame generated by a combustible gas such as a mixture of methane and oxygen. Historically, halide-containing precursors, such as silicon tetrachloride and mixtures of silicon tetrachloride with various dopants have been used for producing waveguide preforms by vapor phase deposition techniques such as, for example, VAD (vapor axial deposition) and OVD (outside vapor deposition).

In these procedures, typically a vapor delivery process is utilized in which halide-containing raw materials are vaporized at a location remote from the burner. The vaporized raw materials are then transported to the burner by a carrier gas where they are volatilized and hydrolyzed to produce soot particles which are collected on a receptor surface. The receptor surface may be a flat substrate in the case of planar waveguide fabrication, a rotating starting rod (bait tube) in the case of VAD for waveguide fiber fabrication, or a rotating mandrel in the case of OVD for waveguide fiber fabrication. In some OVD systems, the cladding portion of the waveguide preform is deposited on a previously formed core preform, instead of on a mandrel.

Because of the deleterious environmental effects associated with the use of halide-containing precursors, as described in Cain et al., U.S. Pat. No. 5,599,371 and Dobbins et al., U.S. Pat. No. 5,043,002, halide-free silicon-containing raw materials have been proposed as alternative precursors for forming waveguide preforms. In particular, as described in the Dobbins et al. patent, the relevant portions of which are incorporated by reference, polymethylsiloxanes are preferred precursor materials, with polymethylcyclosiloxanes being particularly preferred, and octamethylcyclotetrasiloxane being especially preferred. Blackwell et al., U.S. Pat. No. 5,152,819, which is incorporated herein by reference, describes additional halide-free silicon compounds, in particular, organosilicon-nitrogen compounds having a basic Si—N—Si structure, siloxasilazanes having a basic Si—N—Si—O—Si structure, and mixtures thereof, which may be used to produce high purity fused silica glass. Both the Dobbins and Blackwell patents disclose vaporizing the halide-free precursor at a location remote from the burner, transporting the vaporized precursor to the burner using a carrier gas, and combusting the vaporized precursor in a burner.

Hawtof et al. U.S. patent application Ser. No. 08/767,653, filed on Dec. 17, 1996 and entitled "Method and Apparatus for Forming Fused Silica by Combustion of Liquid Reactants," the contents of which are incorporated by reference, discloses that delivery of a vaporized polyalkylsiloxane feedstock to a burner can be problematic. Specifically, high molecular weight species can be deposited as gel in the line carrying the vaporous precursors to the burner or within the burner itself. This gelling reduces the soot deposition rate, and during optical waveguide preform manufacture, leads to imperfections in the preform that will produce defective or unusable optical waveguide. Hawtof et al. U.S. application Ser. No. 08/767,653 discloses that this gelling of polyalkylsiloxane can be overcome by delivering the polyalkylsiloxane in liquid form to the burner and atomizing the liquid precursor at or proximate to the burner.

Numerous burner designs have been developed for use in vapor delivery processes, examples of which can be found in Moltzan et al., U.S. Pat. No. 3,642,521, Powers, U.S. Pat. No. 4,165,223, Moltzan U.S. Pat. No. 3,565,345, Moltzan U.S. Pat. No. 3,698,936, and Cain et al., U.S. Pat. No. 5,599,371. The previously discussed Hawtof et al. U.S. Patent application discloses a burner design for use in a liquid delivery precursor process.

Whether the precursor is delivered to the burner in vapor form or liquid form, it is important that the burner provides a distributed, even stream of precursor to be reacted in the flame of the burner to form the soot which is deposited on the receptor surface. This consideration is particularly important during waveguide manufacture to form accurate refractive index profiles. Current burners are typically manufactured using metal machining technology. One disadvantage of current burner design is that it is very difficult to manufacture burners for deposition of metal oxide soot having orifices and supply channels on a miniaturized scale, i.e. channels and orifices having widths or diameters less than 150 microns. Variability of mass produced parts is also problem with current burner technology, in addition to the cost in machining precision channels and orifices on a miniaturized scale.

In addition to the above general considerations for burners, for liquid delivery burners in which the liquid precursor is atomized, uniform orifice size and accurate dimensions of the burner channels and orifices are key features in achieving targeted and uniform droplet size which is extremely important in complete combustion of the precursor materials. Burners used in liquid delivery systems are typically separately fabricated and later integrated with the atomizing device which atomizes the liquid prior to combustion. Conventional atomizing devices typically provide a spray having a large droplet size distribution. The larger droplets are difficult to combust, and uncombusted droplets can cause defects in the product made by the deposited soot.

In view of these disadvantages, it would be desirable provide a burner produced by micromachining procedures to provide micron size orifices, channels and tolerances that could be consistently reproduced. It would also be useful to provide a burner for use in a liquid delivery system which includes a liquid atomizer formed as part of the burner, with the atomizer producing small droplets and a narrow droplet size distribution to enable efficient combustion of liquid precursor droplets.

SUMMARY OF INVENTION

Accordingly, the present invention generally provides a burner for producing a flame from a combustible gas in which a precursor undergoes a chemical reaction to form a soot. It will be understood that the burner of the present invention can be used for vapor precursor delivery systems, wherein the precursor vaporized remotely from the burner and delivered to the burner in vapor form using a carrier gas, and liquid precursor delivery systems, wherein the precursor is delivered to the burner in liquid form, atomized and vaporized proximate the burner face. For embodiments in which the burner is used in liquid delivery systems, the burner includes an atomizing element in the structure of the burner for atomizing the liquid precursor prior to combustion.

The burner of the present invention can be fabricated to include channels and orifices having widths or diameters smaller than 150 microns, and in some embodiments, smaller than 10 microns. The burner comprises a plurality of substantially planar layers arranged in a generally parallel and fixed relationship, the layers defining a housing having a gas inlet in fluid communication with a gas source and a precursor inlet in fluid communication with a precursor source. Each layer includes a planar surface having multiple openings therethrough, and the planar surface of one of the layers defines a burner face. The gas inlet is in fluid communication with a first portion of the openings to direct the gas to exit the burner through the burner face, and the precursor inlets are in fluid communication with a second portion of the openings to direct the precursor to exit through the burner face.

Preferably, at least a portion of the layers is formed from silicon carbide or an elemental semiconductor material such as silicon. It is preferred that the openings are micromachined through the layers. In another embodiment, at least a portion of the layers includes channels formed within the planar surface of the layers, a first portion of the channels in fluid communication with the precursor inlet and a second portion of the channels in fluid communication with the precursor inlet. In another embodiment, the second portion of the openings through at least one of the planar layers are sized to atomize a liquid into droplets having a Sauter mean diameter small enough to be fully vaporized at a temperature less than about 2700° C.

In an alternative embodiment, one of the layers is a distributor layer having openings therethrough for establishing a substantially constant pressure for each precursor and gas flowing through the distributor layer. In another embodiment, the burner face has a slit-shaped orifice therethrough, and the layer defining the burner face is bonded to a second layer having a slit-shaped orifice therethrough such that the first slit-shaped orifice and the second slit-shaped orifice are generally aligned to form a main orifice in a central region of the burner. The main orifice is preferably in fluid communication with the burner gas inlet and the precursor inlet. Preferably, the main orifice further includes an inner surface having an atomizing edge for atomizing liquid precursor contacting the atomizing edge.

In another alternative embodiment, the burner of the present invention has an atomizing element included in at least one of the layers. In one embodiment, the atomizing element comprises a plurality of orifices sized to atomize the liquid into droplets having a Sauter mean diameter small enough to be fully vaporized at a temperature below about 2700° C. In another embodiment, the atomizing element comprises an airblast atomizer including a main gas orifice having an atomizing edge in fluid communication with the liquid precursor and an atomizing gas.

The present invention also includes a method of making a metal oxide soot, preferably silica soot, comprising the steps of providing a burner comprised of a plurality of substantially planar layers having a planar surface with multiple openings micromachined, preferably etched, therethrough. A first portion of the openings is in fluid communication with a precursor inlet and a second portion of the openings is in fluid communication with a gas inlet. Combustible gas is flowed through the first portion of the openings and ignited, and precursor is flowed through the second portion of the openings and into the flame to combust the precursor and form the metal oxide soot.

In one embodiment of the method of the invention, the orifice includes an atomizing edge, and liquid precursor is flowed through the orifice, contacts the atomizing edge to form a thin liquid film on the edge. Gas flowing through orifices impinges on the film of liquid to atomize the liquid precursor, which is combusted in the flame of the burner. In an alternative embodiment, liquid precursor is flowed through an opening or plurality of openings sized to atomize the liquid into droplets having a Sauter mean diameter small enough to be atomized at a temperature below about 2700° C.

The present invention provides a burner and method that allows for distributed, even flow of each of the precursor and gasses passing through the burner and exiting a burner face defined by the planar surface of one of the planar layers. The distributed, even flow is a result of openings through at least a portion of the layers that are small enough to create a high back pressure and equalize the flow through the openings. Preferably, the small openings that create the back pressure are in a distributor layer or a layer defining the burner face. In addition, the present invention provides a burner having orifices and channels that can be fabricated on a micron scale to enable more accurate and efficient deposition of metallic oxide soot on a receptor surface. Such accurate deposition will enable a greater percentage of soot to be captured on a receptor surface such as a mandrel, and consequently, result in less soot waste due to soot not reaching the intended receptor surface. In waveguide manufacturing processes, increased deposition accuracy and efficiency also enable improved refractive index profile control during the manufacture of optical waveguides.

Additional features and advantages of the invention will be set forth in the description which follows. It is to be understood that both the foregoing general description and the following detailed description are exemplary embodiments and are intended to provide further explanation of the invention as claimed. In the drawings, like reference characters denote similar elements throughout the several views. Various elements of the drawings are not intended to be drawn to scale, but instead are sometimes purposely distorted for the purposes of illustrating the invention.

BRIEF DESCRIPTION OF THE DRAWINGS

FIG. 1A is a side view of the burner shown in FIG. 1, showing the individual layers in a detached relationship;

FIG. 2 is a top view of a burner in accordance with another embodiment of this invention;

FIG. 3 is a top view of a manifold layer of a burner in accordance with an embodiment of this invention;

FIG. 6 is a sectional view taken along line 6—6 of FIG. 4;

FIG. 7 is a top view of a burner in accordance with another embodiment of this invention;

FIG. 8 is a sectional view taken along line 8—8 of FIG. 7 showing a face layer and a sub face layer stacked to form an airblast atomizer element;

FIG. 9 is a top view of a burner in accordance with another embodiment of this invention; and FIG. 10 is a sectional view taken along line 10—10 FIG. 9 showing three substantially planar layers stacked to form an airblast atomizer element.

DETAILED DESCRIPTION

Figure 1:
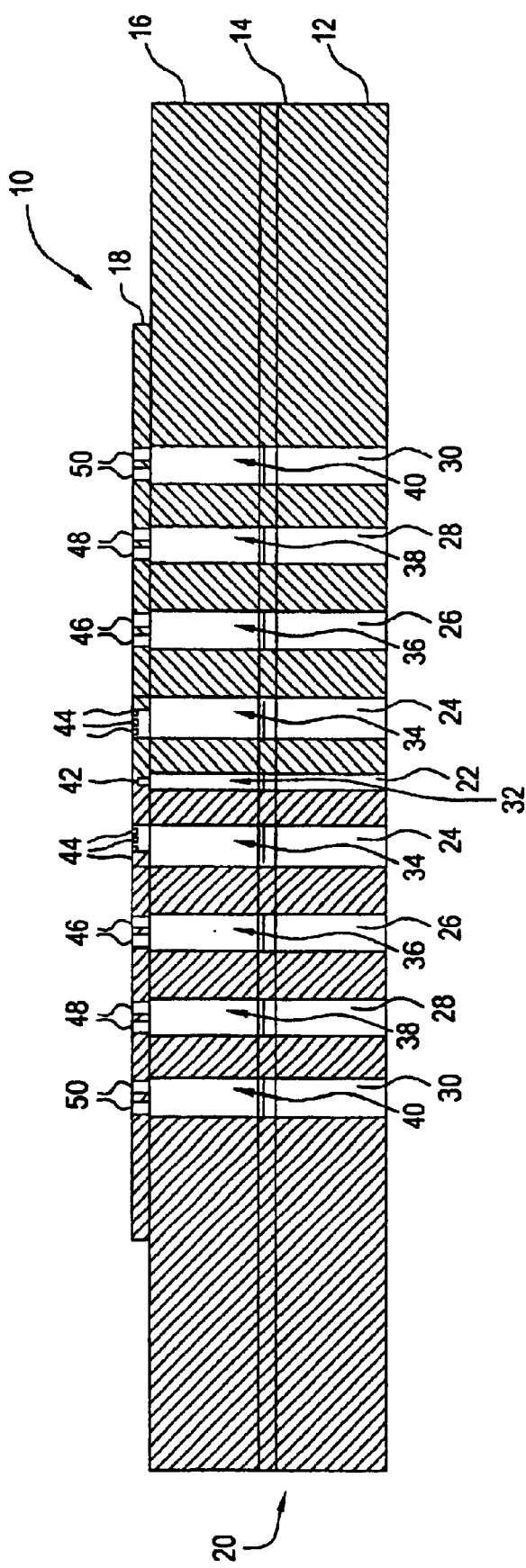
FIG. 1 is a side view of a burner in accordance with an embodiment of this invention, showing the individual layers in a fixed relationship.

An exemplary embodiment of the burner of the present invention is shown in FIG. 1 and FIG. 1A and is designated generally by reference numeral 10. The burner 10 is a burner for producing a flame from a combustible gas in which a precursor undergoes a chemical reaction to form an inorganic soot, preferably a metallic oxide soot. In an exemplary, preferred embodiment of the present invention the burner is used to produce doped or undoped silica soot by reacting a silicon-containing precursor in the flame produced by the burner 10.

The burner 10 comprises a plurality of substantially planar layers arranged in a generally parallel and fixed relationship. Each layer is preferably at least about 100 microns to about 1 millimeter thick, and the length and width of each layer will depend on the particular application for which the burner is used. For example, burners used for the production of silica soot for waveguide fiber preform may be approximately 1 centimeter wide and one centimeter long. The length and width of the layers can be smaller or larger however, limited by the size of semiconductor wafer fabrication procedures. Preferably, at least a portion the layers is fabricated from a material that can be micromachined and precisely fused together in a generally parallel and fixed relationship, as shown in FIG. 1. More preferably, a portion of the layers is formed from an etchable material such as an elemental semiconductor material or silicon carbide. Suitable elemental semiconductor materials include various orientation silicon (e.g., (100) orientation silicon), polycrystalline silicon, and germanium. Preferably, another portion of the layers are made of a material that can be bonded to the layers made from the elemental semiconductor material. Borosilicate glass or phosphosilicate glass, e.g., PYREX® glass are examples of such materials.

As used herein, the terms "micromachined," "micromachinable," and micromachining" relate to techniques for forming precision orifices and channels less than about 150 microns in diameter or width. In some embodiments the orifices and channels may be less than about 10 microns in diameter or width. Such small diameters and widths can not be consistently produced using conventional burner fabrication procedures. Micromachining includes conventional techniques used in the fabrication of integrated circuits, such as lithography, masking, etching, photochemical processes, reactive ion etching (RIE), ultrasonic machining, vertical wall micromachining, and crystallographic etching. The specific technique used will depend upon the material used, particularly the crystal structure and orientation. Such techniques are described in commonly assigned, copending patent applications, Rovelstad et al., U.S. application Ser. No. 08/889,852, entitled "Gas-Assisted Atomizing Devices and Methods of Making Gas-Assisted Atomizing Devices", filed on Jul. 8, 1997 and Rovelstad et al., international application no. PCT/US 97/11622, entitled, "Rayleigh-Breakup Atomizing Devices and Methods of Making Rayleigh-Breakup Atomizing Devices", filed on Jul. 8, 1997, both of which are incorporated by reference in their entirety.

The individual planar layers may be connected by fusion bonding with or without a flowable layer such as a borophosphosilicate glass or phosphosilicate glass. Alternatively, fusion bonding could be used with an alloying layer, for example, a gold-indium or copper thin film to bond the planar layers together.

Referring to FIGS. 1 and 1A, the burner 10 comprises a plurality of layers, for example, an inlet layer 12, a distributor layer 14, a sub face layer 16, and a face layer 18. It will be understood, of course, that the burner could comprise a greater or fewer number of layers than shown. For example, the burner could include additional distributor layers or a filter layer (not shown) for filtering gasses and precursors flowing through the burner (not shown). Alternatively, the distribution and filtering could be achieved by a device placed between the gas or precursor supply and the burner, thus eliminating the need for the distributor layer 14 and filter layer. Preferably, the burner includes at least the face layer 18, and the inlet layer 12.

The layers are arranged in a generally parallel and fixed relationship and define a housing 20. The inlet layer 12 includes an opening therethrough to provide a precursor inlet 22 in fluid communication with a precursor source (not shown) and a second pair of openings therethrough to provide gas inlets 24 in fluid communication with a gas source. The inlet layer 12 may further include further openings therethrough to provide auxiliary inlets 26, 28, and 30. As shown in FIG. 1 and FIG. 1A, each of the planar layers have openings therethrough, and the openings through each of the planar layers are generally aligned to define fluid pathways 32, 34, 36, 38 and 40 in the burner, which are respectively in fluid communication with inlets 22, 24, 26, 28 and 30. Fluid pathway 32, which is in fluid communication with precursor inlet 22 thus forms a precursor pathway, and fluid pathways 34 in fluid communication with gas inlets 24 form gas pathways 34. The auxiliary inlets and fluid pathways could be used to flow additional precursor or gasses to the burner.

Still referring to FIG. 1, the face layer 18, which defines the burner face, contains face openings 42, 44, 46, 48, and 50 therethrough respectively generally aligned with and in communication with the fluid pathways 32, 34, 36, 38 and 40. Fluid flowing through the respective inlets and fluid pathways exit the burner through the face openings 42, 44, 46, 48, and 50 through the face layer. In accordance with one aspect of the invention, face openings 42, 44, 46, 48 and 50 are sized smaller than the respective fluid pathways they are in communication with. As shown in FIG. 1, for example, there are two face openings 46, 48 and 50 in communication with fluid pathways 36, 38, and 40. Face opening 42 is sized smaller than fluid pathway 32. There are three face openings 44 in communication with fluid pathway 44. The face openings are preferably smaller than about 150 microns in diameter or width, and in some embodiments, the face openings may be smaller than about 10 microns in diameter or width.

Referring now to FIG. 2, which shows a top view of the face layer 18 in accordance with one embodiment of the invention, each of the layers includes a planar surface 26. As shown in FIG. 2, the face layer 18, includes face openings therethrough. In one aspect of the invention, face opening 42 is in fluid communication with a precursor pathway and precursor inlet so that precursor can exit the burner face through face opening 42. Face openings 44 are in fluid communication with a gas inlet and gas pathway which allow a gas such as oxygen, nitrogen, or a mixture thereof to exit the burner through the burner face. Auxiliary face openings 46, 48 and 50 in fluid communication with auxiliary fluid pathways and auxiliary inlets allow auxiliary gasses such as combustible gasses, oxygen, and an inert gas such as nitrogen to exit the burner through the face. For example, nitrogen, oxygen, or a mixture thereof may exit the burner face through face openings 46 and 50 and a combustible gas such as a mixture of methane and oxygen may exit the burner through face openings 48.

FIG. 3 shows a top view of the distributor layer 14 which includes a greater number of openings than the inlet layer 12 and the sub face layer 16. In addition the openings in the distributor layer 14 are preferably smaller than the openings in the inlet layer and the subface layer. As an example, the distributor layer 14 will have at least twice the number of openings as the inlet layer or the sub face layer. These distributor openings 62, 64, 68, and 70 are generally aligned with the respective fluid pathways in the burner. As shown in FIG. 1A, the surface of the distributor layer bonded to the inlet layer 12 may include welled areas 71 in alignment with the inlets 22, 24, 26, 28, and 30. These welled areas can be etched through part of the thickness of the distribution layer 14, leaving thinned areas 73 of material in the distributor layer. The distributor openings 62, 64, 66, 68 and 70 may then be formed through the thinned areas 73 by masking and etching techniques. The distributor openings in the distribution layer 14 evenly distributes the flow and establishes a substantially constant pressure for each of the precursor and gasses flowing through the burner.

In one aspect of the present invention, at least a portion of the layers are formed from a micromachinable material, preferably an etchable material such as an elemental semiconductor material or silicon carbide. In a preferred embodiment of the present invention, a portion of the layers are formed from (100) orientation silicon. It is preferred that at least the face layer 18 is made from silicon, and the distributor layer 14 may also be formed from silicon. It is preferred that the mounting layer 12 is formed from a glass material such as borosilicate or phosphosilicate glass, e.g. PYREX®. The subface layer 16 and additional layers may also be formed from the same material as the mounting layer 12.

According to another aspect of the present invention, a portion of openings through the layers are sized to atomize liquid passing therethrough into droplets having a Sauter mean diameter small enough to be fully vaporized at a temperature below about 2700° C. The specific Sauter mean diameter which can be fully vaporized will depend on the specific precursor to be vaporized and the temperature of the flame produced by the burner, which can be determined through experimentation. Although the exact mechanism of breakup of the liquid into small droplets is not known, it is believed that the jet of liquid forced through small openings will break into small droplets by Rayleigh breakup of the liquid. Accordingly, the openings sized to atomize liquid passing therethrough function as atomizing elements contained in the structure of the burner.

In a preferred embodiment of the present invention, the face openings 42, which are in fluid communication with precursor pathway 32, are sized to atomize a precursor liquid stream into droplets having a Sauter mean diameter small enough to be fully vaporized at a temperature below about 2700° C. As used herein, the term "Rayleigh breakup," means flowing a liquid through a small opening or orifice to form a liquid jet that will break into small droplets with a narrow droplet size distribution. When the liquid jet emerges from the small opening as a continuous stream having a cylindrical form, competition between cohesive and disruptive forces on the surface of the jet creates oscillations and perturbations. The oscillations will amplify and the liquid stream will disintegrate into small drops to form the spray. Further information on Rayleigh breakup may be found in *Atomization and Sprays*, by Arthur H. Lefebvre, Hemisphere Publishing Co., 1989, which is incorporated by reference.

Thus, according to the present invention, liquid precursor flows through inlet 22, fluid pathway 32 and through face openings 42. The precursor is atomized into as it exits the face openings 42 into small droplets that are approximately twice the size of the face openings 42. For example, liquid forced through face openings that are 10 microns in width or diameter will produce droplets having a Sauter mean diameter of approximately 20 microns. The appropriate flow rate can be determined by experimentation. A combustible gas such as a mixture of methane and oxygen exiting the burner through face openings 48 is ignited to provide a flame. The atomized precursor flowing into the flame is combusted and forms a metallic oxide soot. Auxiliary gasses may be supplied to the burner 10 through inlets 24, 26 and 30 and exit the burner through face openings 44, 46, and 50. The auxiliary gasses may include oxygen, nitrogen, or a mixture thereof. It will be understood, of course, that the particular inlets and openings through which the precursor, combustible gas and auxiliary gasses flow could be reconfigured to optimize combustion of the precursor.

Rayleigh breakup of the jet may further involve introducing an external disturbance into the liquid jet having a relatively constant frequency to assist the jet breakup process and yield a spray having a narrow droplet size distribution. A disturbance can be introduced by placing a protuberance in the path of the liquid jet, such as a flexible strip. Alternatively, a disturbance could be introduced into the liquid jet by a fluid feedback oscillator or a piezoelectric oscillator. The relatively constant frequency should correspond to the specific wavelength desired for the disturbance (this frequency is related to wavelength by the jet velocity) or a wide spectrum of frequencies including the wavelength corresponding to the fastest growing disturbances (the Rayleigh wavelength). The collapse of a non-circular liquid jet creates an oscillation with many frequencies. Specifically, surface tension reshapes the liquid jet to eliminate edges with smaller radius of curvature than other parts of the jet's surface. This sets up an oscillation in the jet which, when properly optimized (empirically or through computation), can promote breakup into uniformly sized droplets. Details on the calculation of proper frequency of the disturbance may be found in the Rovelstad et al. U.S. patent application entitled, "Rayleigh-Breakup Atomizing Devices and Methods of Making Rayleigh-Breakup Atomizing Devices."

In embodiments in which liquid is atomized by Rayleigh breakup, the openings preferably have a circular cross-sectional shape, which causes minimal jet perturbation. However, other non-circular cross-sectional shapes may be used. Upon atomization of the liquid precursor, the tiny droplets are vaporized in the flame of the burner and combusted to form an inorganic soot. In a preferred embodiment, a silicon containing precursor is atomized and combusted to form silica soot.

The burner face layer 18 may include a single opening to atomize the liquid precursor by Rayleigh breakup. In a preferred embodiment shown in FIG. 2, a plurality of face openings 42 are formed in the face layer for atomizing a liquid precursor. The face openings 42 shown in FIG. 2 are arranged in a linear array, which is particularly useful for forming a linear soot profile and depositing the soot formed by the burner on a cylindrical mandrel or bait rod. The precisely formed linear array of openings 52 will allow a narrow stream of soot to be targeted at the mandrel to improve the soot capture rate on the mandrel.

Figure 4:
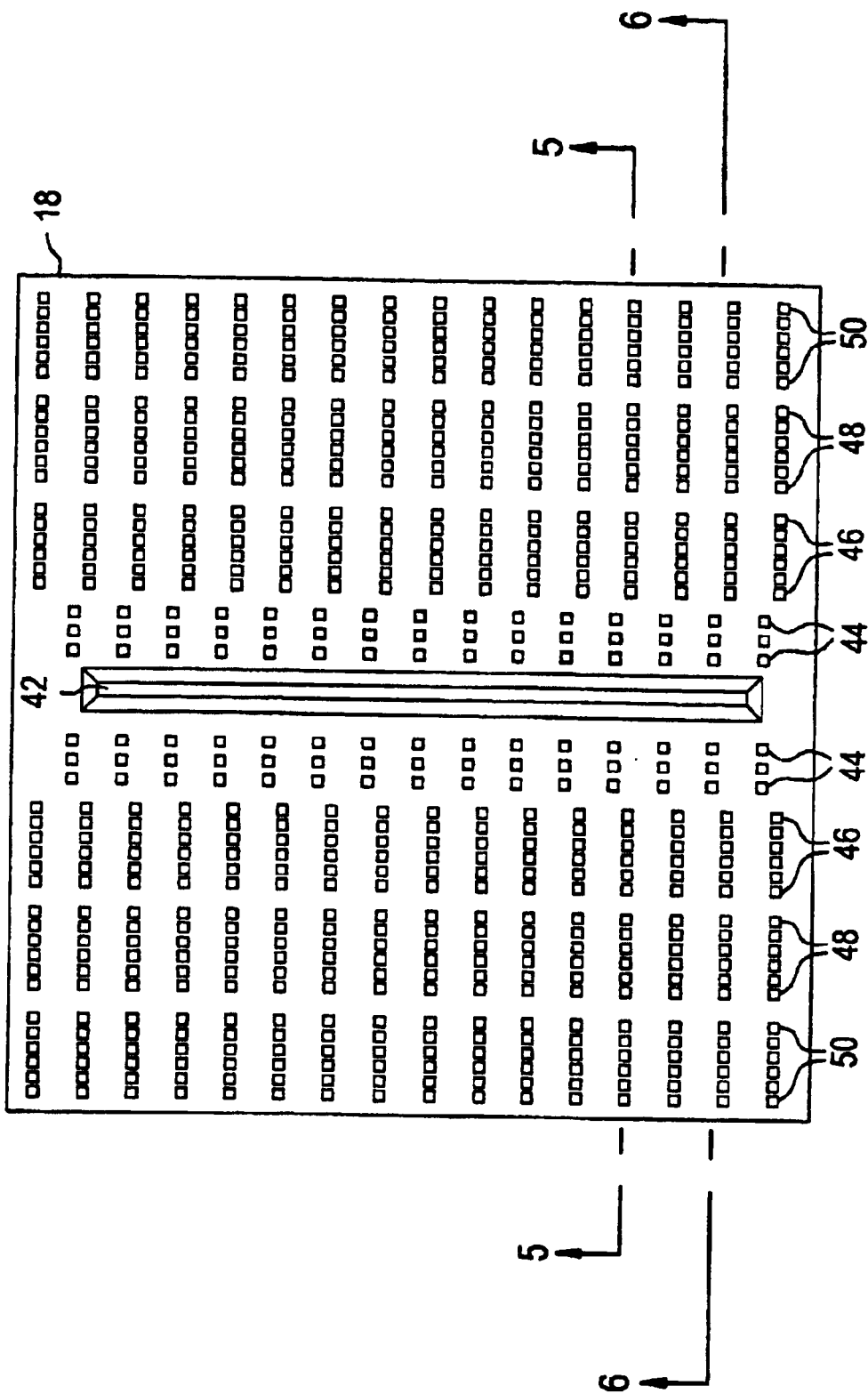
FIG. 4 is a top view of a burner in accordance with another embodiment of this invention.
Figure 5:
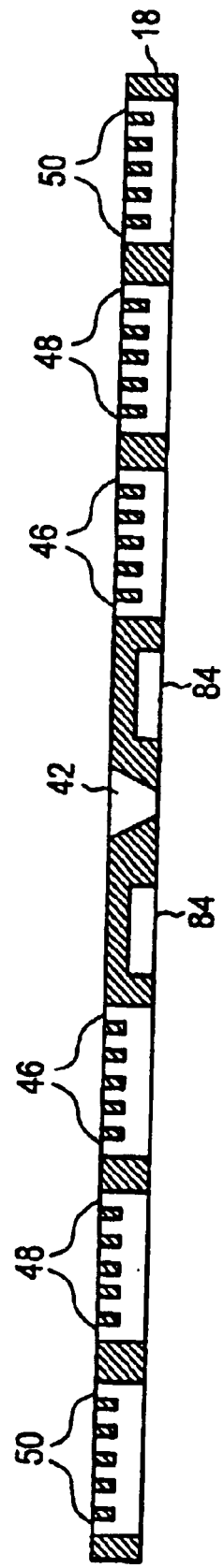
FIG. 5 is a sectional view taken along line 5—5 of FIG. 4.

FIG. 4 shows the face layer 18 of another embodiment of the invention. Similar to the previously described embodiment, the burner shown in FIG. 4 may include an inlet layer and a distributor layer arranged in a generally parallel and fixed relationship with the face layer 18 (not shown). Face opening 42 comprises a slit-shaped orifice through a central region of the burner face 18. The burner face also includes face openings 44, 46, 48 and 50. Referring to FIG. 5, the face layer 18 has areas of reduced thickness which form channels 84 between the face layer and the layer bonded thereto so that fluid flows through the channel substantially parallel to the planar surface of the layer. Channels 84 are in fluid communication with face openings 44 and a fluid inlet to allow precursor or gas to exit the burner face through face openings 42. As shown in FIG. 6, areas of reduced thickness within the face layer 18 form channels 86, 88 and 90. Channels 86, 88, and 90 are respectively in fluid communication with face openings 46, 48, and 50 and fluid inlets (not shown) to allow precursor or gas to exit the burner face through the respective face openings.

FIG. 7 shows the face layer 18 another embodiment of the present invention. The face layer 18 has a slit-shaped orifice 42 in a central region of the burner face, and face openings 46, 48, and 50 through the face layer 18. FIG. 8 is a sectional view through line 8—8 of FIG. 7, showing the face layer 18 and the subface layer 16. Face openings 46, 48, and 50 are respectively aligned with and in fluid communication with fluid pathways 36, 38 and 40 in subface layer 16. Subface layer 16 also includes a slit-shaped orifice 32 therethrough, and the face layer 18 and subface layer 16 are bonded together so that the slit-shaped orifice 32 and the slit-shaped orifice 42 form a main orifice 100. Fluid pathway 34 is in fluid communication with the main orifice 100. The fluid pathways 32, 34, 36, 38 and 40 are in fluid communication with fluid inlets (not shown). The embodiment shown in FIG. 7 may also include a distributor layer and an inlet layer, similar to the embodiment described in FIG. 1.

In operation, according to one aspect of the invention, a precursor material is delivered to a precursor inlet in the burner and flows through fluid pathway 32 and exits the burner through main orifice 100. Precursor may also flow through fluid pathway 34 and exit the burner through main orifice 100. The precursor may be in liquid or vapor form, however, when the precursor is delivered to the burner in liquid form, preferably, the main orifice further includes an atomizing element, which will be described in more detail below. A gas such as nitrogen, oxygen or a mixture thereof may be delivered to fluid pathways 36 and 40 and exit through face openings 46 and 50, and a combustible gas such as a mixture of methane and oxygen may be delivered to fluid pathway 38 and exit the burner through face openings 48. The combustible gas flowing through face openings 48 and ignited to provide a flame in which the precursor material is converted to an inorganic soot.

Still referring to FIG. 8, in one embodiment of the invention, the main orifice 100 includes a liquid atomizing element. The liquid atomizing element may be included on an inner surface of the main orifice in the form of an atomizing edges 110. The atomizing edges 110 may be about 10 millimeters to 100 millimeters long and separated by a width of preferably no greater than about 250 microns, more preferably about 25 to 100 microns. The atomizing edges are almost atomically sharp, which facilitates atomization. According to another aspect of the invention, liquid precursor flowing through fluid pathway 34 at a rate of, for example, about 5 millimeters per minute, contacts atomizing edge 110. A gas, such as nitrogen, oxygen, or a mixture thereof flows at a high velocity (e.g., about 100 m/s) through fluid pathway 32 and converges on the liquid precursor contacting the atomizing edges 110. Liquid precursor flowing over the atomizing edges forms a thin layer and is atomized into small droplets by the high velocity gas. Further details on appropriate flow rates may be found in Rovelstad et al. U.S. patent application, "Gas-Assisted Atomizing Devices and Methods of Making Gas-Assisted Atomizing Devices." Combustible and auxiliary gasses may be flowed through fluid pathways 36, 38 and 40 to exit the burner through face openings 46, 48, and 50 to provide a flame in which the atomized precursor is vaporized and combusted to form a soot.

FIG. 9 shows a top view of another embodiment of the present invention. The top view of the embodiment shown in FIG. 9 appears the same as the embodiment shown in FIG. 7. However, referring to FIG. 10, the embodiment shown in FIG. 9 includes three layers which define an atomizing element. The face layer includes slit-shaped orifice 42 and face openings 46, 48, and 50. The subface layer 16 and a second subface layer 15 include a slit-shaped orifice 32 therethrough. The face layer 18 and subface layer 16 are bonded together so that the slit-shaped orifice 42 and slit-shaped orifice 32 are aligned to form a main orifice 100. The subface layer 16 and second subface layer 15 further include openings therethrough which define fluid pathway 34 in fluid communication with the main orifice and openings therethrough which define fluid pathways 36, 38 and 40 respectively in fluid communication with face openings 46, 48 and 50. The second subface layer includes an opening therethrough defining fluid pathway 33 in fluid communication with the main orifice 100. The main orifice includes atomizing edges 110, preferably separated by a width no greater than about 250 microns. As with the previous embodiments, the embodiment shown in FIG. 9 may further include a manifold layer and an inlet layer, with the layers arranged in a generally parallel and fixed relationship.

In operation, and according to one embodiment of the method of the present invention, precursor flows through fluid pathways 33, and a gas such as nitrogen, oxygen or a mixture thereof flow through fluid pathways 32 and 34. Alternatively, precursor may flow through all three fluid pathways 32, 33, and 34. A gas such as nitrogen or oxygen flows through fluid pathways 36 and 40 and exits the burner through face openings 46 and 50. A combustible gas such as a mixture of methane and oxygen flows through fluid pathways 38 and exits the burner through face openings 48. The combustible gas is ignited to provide a burner flame and the precursor flowing into the flame combusts to form an inorganic soot.

According to another aspect of the present invention, the burner shown in FIGS. 9 and 10 can be used to atomize and combust a liquid precursor to form a metallic oxide soot, such as silica soot. Nitrogen, oxygen or a mixture thereof flows through fluid pathways 36 and 40 and exit the burner face through face openings 46 and 50. Combustible gas flows through fluid pathways 38 and exits the burner through face openings 48. The combustible gas is ignited to provide a burner flame. Liquid precursor is flowed through fluid pathways 33. The liquid is flowed at rate sufficient to form a thin film on the atomizing edge, which will depend on the size of the openings of the openings and the fluid pathways. A high velocity gas, preferably, nitrogen, oxygen or a mixture thereof is flowed through fluid pathways 32 and 34. The liquid flowing through fluid pathway 33 forms a thin film on atomizing edge 110, and the high velocity gas tears the liquid into small droplets which exit the burner through main orifice 100. The droplets are then combusted in the burner flame to form a metallic oxide soot. High velocity gas, preferably nitrogen, oxygen or a mixture thereof may be flowed through fluid pathways 34 to aid in atomization of the liquid precursor. The gasses flowing through fluid pathway 34 and fluid pathway 32 effectively pinch the liquid at the atomizing edges 110.

The burners and method of the present invention provide several advantages. The micromachined fluid pathways, openings and orifices produce a focused soot which can be matched to the dimensions of the receptor surface. Further, the flow of the gasses and precursor in a direction transverse to the planar surface of the layers provides for even flow distribution through the burner. The micromachined burners of the present invention can be arranged in arrays in which gas and precursor flows to the individual burners can be controlled. This feature is particularly useful in optical waveguide fiber preform manufacture because individual burner control will enable better control of the optical properties at the ends of the preform end effects by varying flows to specified burners. Another advantage of the burners of the present invention is the ability to produce the burners in batches, similar to the way that integrated circuits are batch produced. This feature enables the burners to be easily and uniformly reproduced at a low cost.

It is expected that further experiments in burner design will lead to further optimization, especially in orifice and pathway size and configuration and fluid flow rates. In embodiments in which the precursor is delivered to the burner as a vapor, the carrier gas may be, for example, a combustible gas, an oxidizing gas, an inert gas, or mixtures thereof. Nitrogen is generally the preferred carrier gas, and a methane/oxygen mixture is preferably the combustible gas used as the burner flame fuel, although oxyhydrogen could also be used as the combustible gas.

The burners of the present invention could be used in a variety of processes. For example, the burners could be used to make metallic oxide soots, which may be deposited on a receptor surface. The receptor surface, which may be a rotating mandrel or a bait rod to form a optical waveguide fiber preform. The preform is then heat treated in a consolidation furnace, and conventional fiber draw techniques can then be employed to make optical waveguide fiber from the consolidated preform.

Alternatively, the receptor surface can be a flat surface or a receptor cup, wherein the deposited soot is either substantially simultaneously with or subsequent to its deposition, the soot can be consolidated into a body of fused silica glass used to make various products. In one exemplary process, soot is applied to a flat substrate to form a base cladding layer, and then further soot is deposited in two successive stages using two different reactant compositions to yield core and overcladding layers over the cladding layer on the substrate. The resultant mass is then consolidated. The design for desired optical waveguide pathways of the component may then be applied lithographically followed by etching to leave the desired waveguides superimposed upon the substrate. Next the component may be overclad and the overcladding may be consolidated. In a second, similar process, the final overcladding is suitably doped so that its refractive index is the same as that of the previously deposited overcladding, but its melting point is lower so that it will easily flow in consolidation at a temperature that will not risk damaging the previously deposited waveguides.

In the embodiments described above regarding the manufacture of fused silica soot, obviously, a variety of silicon containing precursor materials may be used with the burner of the present invention, including halide containing precursors such as silicon tetrachloride. Preferred precursor materials for making silica soot are halide free precursors, for example, siloxanes, particularly, polyalkylsiloxanes such as octamethylcyclotetrasiloxane. In addition, while doping of the glass soot was not discussed, it will be understood that appropriate dopants could be used with the burner of the present invention. These dopants could be delivered with the precursor to the burner, or they could be delivered to the burner through a separate inlet and exit the burner through a separate orifice. Appropriate dopants include, but are not limited to $P_2O_5$ and a metal oxide selected from the group consisting of Groups IA, IB, IIA, IIB, IIIA, IIIB, IVA, VA, and the rare earth series of the Periodic Table of Elements.

It will be apparent to those skilled in the art that various modifications and variations can be made in the of the present invention without departing from the spirit or scope of the invention. For example, the particular shape and configuration of the orifices and openings can be varied from those disclosed herein. In addition, the number of substantially planar micromachined layers can be varied. Thus, it is intended that the present invention cover the modifications and variations of this invention provided they come within the scope of the appended claims and their equivalents

What is claimed is:

1. A method of making oxide soot comprising the steps of:
   providing a burner comprising a first substantially planar layer having a first opening therethrough; a second substantially planar layer having a planar surface defining a burner face, the layer having a second opening therethrough and being bonded to the first layer such that the first and second openings are generally aligned to form an orifice in a central region of the burner; a plurality of gas openings having dimensions less than about 150 microns through the burner face for allowing a combustible gas and auxiliary gasses to exit the burner; gas channels in fluid communication with the gas openings; and precursor channels in fluid communication with the orifice;
   flowing the combustible gas and auxiliary gas through the gas channels and gas openings;
   igniting the combustible gas to provide a flame;
   flowing precursor through the precursor channels, through the orifice and into the flame to combust the precursor and form the oxide soot.

2. The method of claim 1, wherein at least a portion of the layers is formed from an elemental semiconductor material and the orifice is slit-shaped and formed by etching.

3. The method of claim 2, further comprising the steps of vaporizing the precursor remotely from the burner and delivering the vaporized precursor to the burner.

4. The method of claim 2, wherein the orifice further includes an atomizing edge, the precursor is a liquid which flows through the liquid inlet and forms a thin liquid film on the atomizing edge, and gas flows through the orifice to impinge on the liquid film to atomize the liquid precursor.

5. The method of claim 4, wherein the soot is a silica soot and the precursor is a silicon containing precursor.

6. The method of claim 5, further including the steps of flowing the gasses and the liquid precursor through a manifold layer having liquid channels for distributing the liquid precursor to the orifice and gas channels for distributing the gasses to the gas openings to evenly distribute flow of the gasses and the liquid precursor.

* * * * *